United States Patent [19]
Vitel

[11] Patent Number: 6,148,214
[45] Date of Patent: *Nov. 14, 2000

[54] TELEPHONE USING SERVICE MESSAGES FOR IDENTIFICATION SIGNALS

[75] Inventor: Sandrine Vitel, Le Mans, France

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 09/096,699

[22] Filed: Jun. 12, 1998

[30] Foreign Application Priority Data

Jun. 17, 1997 [FR] France .................................. 97 07509

[51] Int. Cl.⁷ ...................................................... H04Q 7/20
[52] U.S. Cl. ........................... 455/462; 455/463; 455/465; 455/464; 455/575
[58] Field of Search ..................................... 455/415, 414, 455/466, 463, 465, 517, 550, 567, 575, 462, 464, 422, 434, 458

[56] References Cited

U.S. PATENT DOCUMENTS

| | | | |
|---|---|---|---|
| 4,875,231 | 10/1989 | Hara et al. .............................. | 455/464 |
| 5,363,429 | 11/1994 | Fujisawa .................................. | 379/58 |
| 5,384,834 | 1/1995 | Sato et al. ............................. | 379/88.21 |
| 5,408,419 | 4/1995 | Wong ..................................... | 455/433 |
| 5,530,736 | 6/1996 | Comer et al. ........................... | 455/458 |
| 5,581,599 | 12/1996 | Tsuji et al. .............................. | 379/63 |
| 5,636,266 | 6/1997 | Ranganath et al. ...................... | 379/58 |
| 5,752,195 | 5/1998 | Tsuji et al. .............................. | 455/462 |
| 5,790,953 | 8/1998 | Wang et al. ............................. | 455/435 |
| 5,812,948 | 7/1998 | Hijern et al. ............................ | 455/435 |
| 5,812,955 | 9/1998 | Dent et al. .............................. | 455/561 |
| 5,920,815 | 7/1999 | Akhavan ................................. | 455/426 |
| 5,930,701 | 7/1999 | Skog ....................................... | 455/415 |
| 5,956,632 | 9/1999 | Shon ....................................... | 455/404 |
| 5,966,665 | 10/1999 | Taki ........................................ | 455/464 |
| 5,995,844 | 11/1999 | Fukuda ................................... | 455/465 |

FOREIGN PATENT DOCUMENTS

| | | | |
|---|---|---|---|
| 08154263 | 6/1996 | Japan .............................. | H04Q 7/14 |
| 2285369 | 7/1995 | United Kingdom ............ | H04M 1/57 |

OTHER PUBLICATIONS

By M. Mouley, M.B. Pautet: "The GSM System For Mobile Communications", 1992, XP002062823, pp. 560–561, Line 2.

Primary Examiner—Daniel S. Hunter
Assistant Examiner—Yemane Woldetatios
Attorney, Agent, or Firm—Dicran Halajian

[57] ABSTRACT

A device of the DECT type is disclosed which includes a base station connected to the telephone network transmitting an identification information signal which defines a calling user. This station is formed by a processor assembly, a memory containing an execution program and a random-access memory. The device also includes at least one handset formed by, inter alia, a display, a processor assembly notably intended to control said display. For transmitting the identification information, broadcasting means are provided for broadcasting to all the handsets by using message transmission means for transmitting messages of the service provided by said DECT standard.

19 Claims, 2 Drawing Sheets

TELEPHONE USING SERVICE MESSAGES FOR IDENTIFICATION SIGNALS

FIELD OF THE INVENTION

The invention relates to a telephony device that satisfies the DECT standard or similar standards, comprising:

a base station connected to the telephone network transmitting an identification information signal which defines a calling user, the base station being formed by, inter alia:
 a processor assembly
 a memory containing an execution program and
 a random-access memory,
at least one handset formed by, inter alia,
 a display
 a processor assembly notably intended to control said display,
service message transmission means for transmitting service messages between the base station and the handsets.

The invention also relates to a base station and equally to a handset suitable for such a device.

The invention likewise relates to a transmission method of transmitting an identification information signal which defines a calling user in a telephony device that satisfies the DECT or similar standard.

The invention finds interesting applications in the telecommunication systems implying protocols which is notably the case with telephony devices satisfying the, for example, DECT standard.

BACKGROUND OF THE INVENTION

The telephony devices of this type quite often comprise a plurality of handsets which offer more and more functions to the user.

SUMMARY OF THE INVENTION

One function which people deem more and more necessary is the display of the calling subscriber's number.

A problem which is posed with this type of device is that this number is to be transmitted to the subscriber terminals without using the radio sources of the device too much and without disturbing the on-going communications too much.

The present invention proposes a device of the type defined in the opening paragraph which allows of supplying this calling subscriber's number to the users while providing a satisfactory solution to the aforesaid problem.

Therefore, such a device is characterized in that this number is broadcast by means of a service message.

The idea of the invention comprises the use of the possibility of broadcasting information signals to all the handsets so as to make the calling subscriber's number known to them. The CLMS message sending procedure of the DECT standard is used which does not hinder the on-going traffic.

BRIEF DESCRIPTION OF THE DRAWING

These and other aspects of the invention will be apparent from and elucidated with reference to the embodiments described hereinafter.

In the drawings.

DETAILED DESCRIPTION OF THE INVENTION

Figure 1:
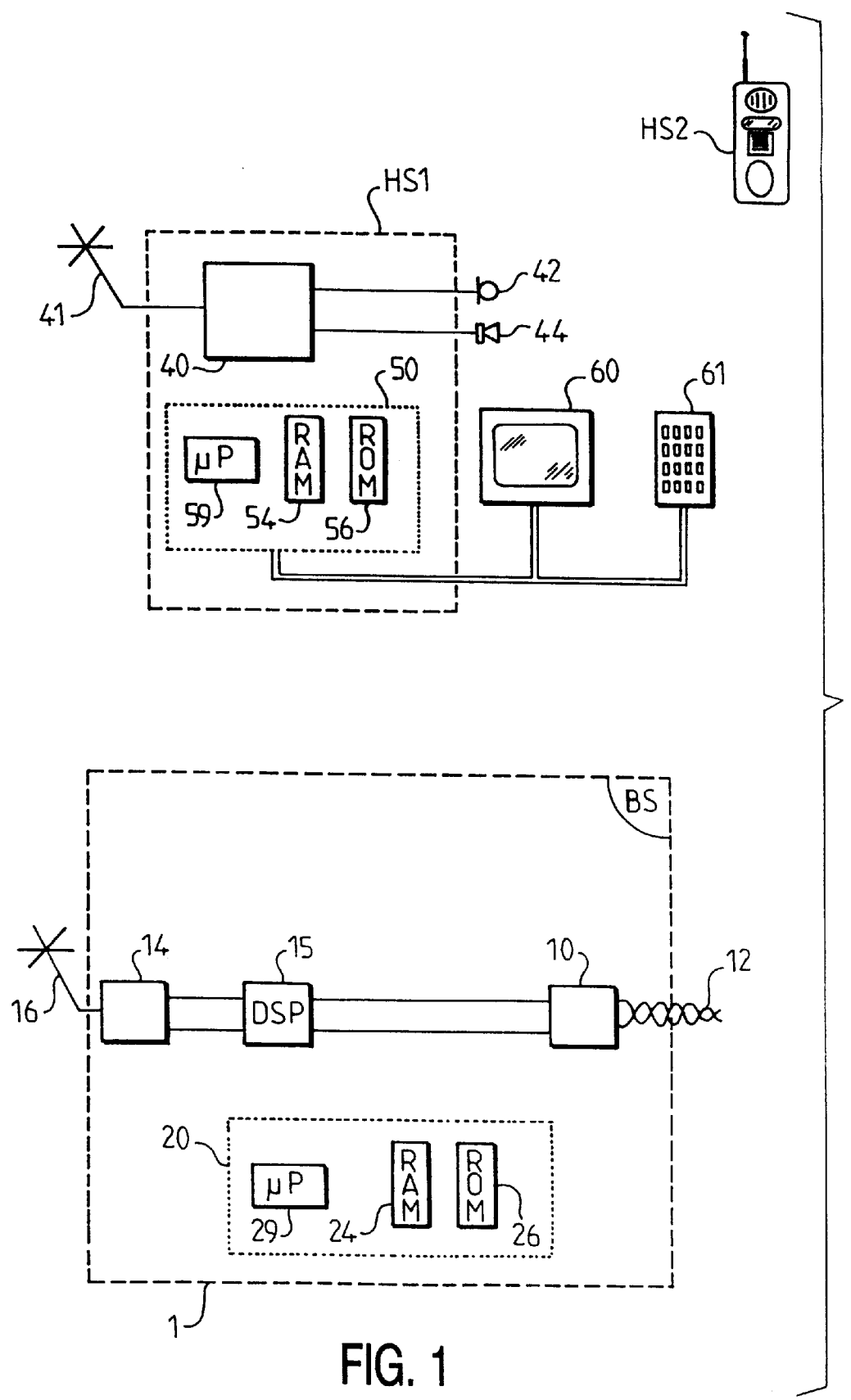
FIG. 1 shows a device according to the invention.

In FIG. 1, the device that is represented is a device that satisfies the DECT standards. Reference 1 shows the base station BS to which may be connected by radio a plurality of handsets HS1, HS2 . . . This base station 1 comprises, inter alia, a line circuit 10 which permits the base station to be connected to the switched network via a telephone line 12 and a radio circuit 14 which authorizes the dialogue with the various handsets HS1 or HS2, . . . by transmitting and receiving waves via an antenna 16. For processing all the analog information which dwells inside the basic circuit, a signal processing element 15 is provided formed around a signal processor DSP which particularly processes the voice signals.

All the elements of this basic circuit 1 are managed by a microprocessor assembly 20. This element is notably formed in usual manner by a random-access memory 24, a read-only memory 26 containing the operating instructions of the device and a management processor 29.

The handset HS1 only shown in detail (the handset HS2 may be of identical structure) comprises a communication assembly 40 with an antenna 41 which permits the handset to communicate with the base station BS and from there with the other handsets HS2, . . . This assembly processes the information coming from the microphone 42 and also produces the signals for an earphone 44. There is also provided a management element 50 formed, just like the management element 20, by a random-access memory 54, a read-only memory 56 containing the operating instructions of the handset and a management processor 59. The handset HS1 also includes a display 60 on which various information signals are displayed and a keyboard 61. These handsets are mobiles and they are therefore powered by an accumulator (not shown in FIG. 1).

According to the invention, the number of the user or of the switched telephone network subscriber who calls is relayed to all the devices connected to the base station. This relay makes use of the possibilities of the DECT standards which manage the operation and the structure of the telephony devices which satisfies said standard.

Thus, for this transmission is used, on the one hand, the service known by the name of Long Paging broadcast, defined in the standard ETS 300 175-3 in paragraphs 7.2.4.1.1 7.2.4.2 and 9.1.3.1 and, on the other hand, the service known by the name of CLMS (Connection List Message Service) defined by the standard ETS 300 175-5 in paragraph 9.

This measure recommended by the invention avoids the use of radio links used for the usual communications between users so that they remain available. The transmission of this identification number thus does not have a detrimental effect on the local traffic.

Figure 2:
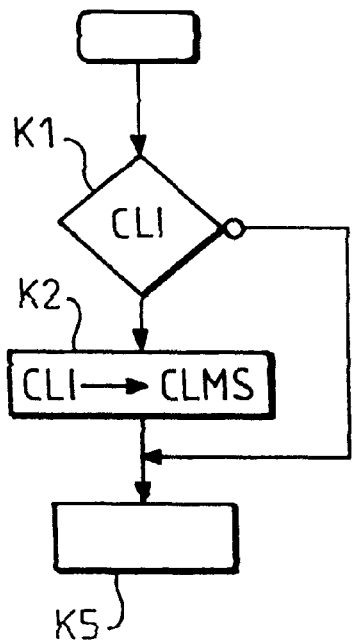
FIG. 2 shows a diagram explaining the operation of the base station.

FIG. 2 explains the operation of the base station 1 with respect to the transmission of this number of the calling user. Box K1 describes the procedure which makes it possible to detect the transmission of the calling party's number on the telephone line 12. This transmission of the number of the user who calls may be formed in accordance with the rules prescribed by the document edited by French Telecom CSE B 14-10W in September 1995. If this number CLI is transmitted (box K2), messages of the CLMS type are used and the operation of the base then takes place as is customary (box K5). If the calling party's number is not transmitted, box K5 is directly proceeded to from box K1.

Figure 3:
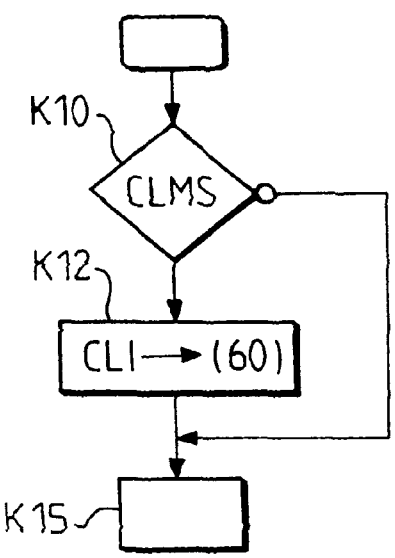
FIG. 3 shows a diagram explaining the operation of a subscriber device.

FIG. 3 explains the operation of the handset. This handset detects the transmission of a message of the CLMS type, box K10. If such a message is transmitted, the number it contains is displayed on the screen 60 (box K12). Then normal operation of this handset is performed in box K15. If there is no CLMS message, this box K15 is directly proceeded to.

The mode of operation that has just been described implies that the messages of the CLMS type are used solely for the transmission of the number of the calling user. If these messages are used for other functions, an information signal is to be added thereto for determining the message that will make the management of these messages possible.

What is claimed is:

1. A telephony device comprising:
   a base station connected to a telephone network, said base station receiving a communication signal and an identification signal of a caller from said telephone network;
   a plurality of handsets which are connectable to said base station via radio links for receiving said communication signal and said identification signal, wherein said communication signal is provided on a first one of said radio links and said identification signal is provided on a second one of said radio links; said second one of said radio links being different than said first one of said radio links so that transmission of said identification signal does not affect availability of said first one of said radio links for transmission of said communication signal; wherein said base station broadcasts said identification signal to all of said plurality of handsets.

2. The telephony device of claim 1, wherein said base station transmits said identification signal to said handset as a service message signal.

3. The telephony device of claim 1, wherein transmission of said identification signal to said handset does not have a detrimental effect on said communication signals.

4. The telephony device of claim 1, wherein said identification signal is not transmitted on said first one of said radio links.

5. The telephony device of claim 1, wherein said identification signal is transmitted by a long paging broadcast.

6. The telephony device of claim 1, wherein said identification signal is transmitted by a connection list message service.

7. The telephony device of claim 1, wherein said identification signal is a telephone number of said caller.

8. The telephony device of claim 1, wherein said base station includes service message transmission means for transmitting said identification signal as a service message signal.

9. The telephony device of claim 1, wherein said handset includes a display which displays messages included in said identification signal.

10. The telephony device of claim 1, wherein said base station includes means for detecting said identification signal and means for including said identification signal in service message for transmission to said handset.

11. The telephony device of claim 1 wherein said communication signals and said identification signals transmitted over said radio links are digital signals.

12. A telephony device comprising:
    a base station connected to a telephone network, said base station receiving communication signals and identification signals from said telephone network;
    a plurality of handsets which are connectable to said base station via radio links for receiving said communication signals and said identification signals from said base station, wherein said base station broadcasts said identification signals to all of said plurality of handsets as service messages; said second one of said radio links being different than said first one of said radio links so that transmission of said identification signal does not affect availability of said first one of said radio links for transmission of said communication signal: wherein said base station broadcasts said identification signal to all of said plurality of handsets.

13. The telephony device of claim 12, wherein said base station includes service message transmission means for transmitting said service messages in response to said identification signals.

14. The telephony device of claim 12, wherein said handset displays messages included in said service messages in response to detecting said service messages.

15. The telephony device of claim 12 wherein said communication signals and said identification signals transmitted over said radio links are digital signals.

16. A method of transmitting in a telephony device comprising:
    receiving by a base station from telephone network communication signals and identification signals;
    including said identification signals in service messages; and
    transmitting from said base station to one of a plurality of handsets said communication signals on a first radio link and broadcasting said service messages on a second radio link to all of said plurality of handsets; said second one of said radio links being different than said first one of said radio links so that transmission of said identification signal does not affect availability of said first one of said radio links for transmission of said communication signal.

17. The method of claim 16, wherein said identification signals include a telephone number of a caller of said communication signals.

18. The method of claim 16, further comprising displaying messages includes in said service messages on a display of said handset.

19. The method of claim 16 wherein said communication signals and said identification signals transmitted over said radio links are digital signals.

* * * * *